United States Patent [19]

Finnell

[11] 4,102,523
[45] Jul. 25, 1978

[54] VEHICLE SEWAGE HOSE SUPPORT SYSTEM

[76] Inventor: Everett Finnell, 5817 N. 29th St., Omaha, Nebr. 68111

[21] Appl. No.: 748,671

[22] Filed: Dec. 8, 1976

[51] Int. Cl.² ............................................. F16L 3/00
[52] U.S. Cl. ..................................... 248/49; 137/144; 138/106; 248/60; 249/75
[58] Field of Search ....................... 248/49, 60, 75, 80, 248/83, 85, 87, 150, 136, 139; 138/106, 107, 110; 137/144

[56] References Cited

U.S. PATENT DOCUMENTS

| 183,695 | 10/1876 | Mersick | 248/150 |
|---|---|---|---|
| 2,289,995 | 7/1942 | Powers | 248/60 |
| 2,707,607 | 5/1955 | O'Connor | 248/60 |
| 2,881,804 | 4/1959 | Bub et al. | 248/49 X |
| 3,077,327 | 2/1963 | Batie et al. | 248/150 X |
| 3,143,146 | 8/1964 | Kennedy | 138/107 |
| 3,572,622 | 3/1971 | Smith | 248/49 |
| 3,623,500 | 11/1971 | Hoy | 137/344 |
| 3,730,228 | 5/1973 | Gibbs | 248/49 X |
| 3,809,348 | 5/1974 | DiLaura | 248/87 X |
| 3,811,462 | 5/1974 | Feliz | 137/344 |
| 3,819,137 | 6/1974 | Smith | 248/49 |

FOREIGN PATENT DOCUMENTS 845,494  6/1970  United Kingdom ................. 138/106

*Primary Examiner*—Roy D. Frazier
*Assistant Examiner*—Rodney H. Bonck
*Attorney, Agent, or Firm*—Hiram A. Sturges

[57] ABSTRACT

A sewage hose support system for recreational vehicles of a type using an elongated sewage hose leading to a sewer pipe. The system having an elongated support assembly module, having upwardly facing hose-engaging surfaces for engaging the right and left undersides of a hose, the module having at least two lengthwise sections telescopically attached for lengthwise collapsing, each lengthwise section having right and left parts interconnected by flexible straps, certain of which are slidable lengthwise along portions of the right and left hose engaging portions to which they are attached so as to prevent right and left portions of the module from spreading apart, while yet permitting lengthwise sections of the module to be telescopically retracted into lesser shape for storage in a trailer or vehicle for road travel.

5 Claims, 4 Drawing Figures

VEHICLE SEWAGE HOSE SUPPORT SYSTEM

BACKGROUND OF THE INVENTION

Sewage systems for recreational vehicles have commonly involved long flexible, lengthwise compressible hoses for interconnecting outlet fittings on the recreational vehicle with a pipe leading to a sewage disposal facility.

Recreational vehicles is a term in this case referring to campers, trailers, motor homes, boats and other installations which are not necessarily so mobile, but which use flexible hoses.

It is common for such hoses to sag down to the ground in a space between the attachment to the recreational vehicle and that end of the hose which empties into a sewer pipe. It is true that in the prior art different support systems for such hoses have been proposed, but for what ever reason I have not seen any of those systems on the market. In my opinion, the reason has most usually been that they are expensive and complicated or will not store as compactly as is desirable.

As a result the trailer or recreational vehicle owner must sometimes be out in the rain and sleet working with the sewage hose to cause waste material in it to progress down the hose and prevent it from clogging by manually moving and wiggling the hose.

If the owner fails to do this manual maintenance of such hoses, then such a clogging will occur and thus cause the sewer to back-up into one or more of the facilities in the trailer which are connected to the sewage system, thereby creating an obnoxious odor in the trailer.

I am aware that various patents in the prior art have addressed themselves to ways to support hoses, but it is my opinion these problems have prevailed is that the various proposals in the prior art patents were either excessively expensive or would not collapse sufficiently for easy storage in a trailer where space is at a premium. It is also true of a boat, a camper or a motor home where space is at a premium and it is necessary to bring, not only the hose, but the support system into the trailer or boat, preparatory for highway travel.

Another disadvantage of prior art systems has been the need to support them on stakes. In many places this is impossible because the area is covered with concrete. In other places it is covered with gravel or rock which is very hard to penetrate with stakes. In still other places the camp site is itself on natural rock.

It is, therefore, an object of this invention to provide a support assembly module which is adapted to be suspended at one end from the sewage outlet fitting on the trailer or other recreational vehicle itself and to be suspended at its other end, either by connection to that part of a sewer pipe which projects outwardly, or else connected to that portion of the hose which is adjacent to and supported by the sewer pipe which extends into the ground.

This way the problem of stakes and concrete or rocky areas would be eliminated.

Still another object is to eliminate materials of the support system that might extend over the top of the pipe itself for achieving an economy by having this feature which is absent in at least one of the prior patents.

Still a further object is to provide a support system which is not only collapsible lengthwise for compact storage, but in addition is laterally collapsible for still further compact storage.

Yet another object is to provide a support system having a minimum number of parts for a minimum cost.

Still another objective is to achieve these other objectives while providing a support system which is generally open on its underside so as to allow rain and sleet to pass therethrough so that ice will not build up in it, since the latter might cause a chilling and freezing of the sewage in the sewer hose, and also a freezing of the sewer hose to the support system making detachment difficult at a time when it is desired to move the house trailer or vehicle.

SUMMARY OF THE INVENTION

A sewage hose support system for recreational vehicles such as house trailers and boats comprising an elongated support assembly module having right and left hose-engaging portions having upwardly facing surfaces for engaging the right and left undersides of a hose, respectively, the module having at least two lengthwise sections telescopically connected to each other, so that the lengthwise sections can be chiefly disposed respectively under different lengthwise sections of such a hose, each lengthwise section having portions defining parts of the right and left hose-engaging portions.

The sewage support system of this invention further has transverse connecting means, such as flexible straps, interconnecting the right and left hose-engaging portions for preventing such portions from spreading apart.

The sewage hose support system further has first and second attachment assemblies attached respectively to end portions of the module, and adapted to be connected to a recreational vehicle supported sewage outlet element at one end of the module and to either a sewer pipe or a portion of the hose adjacent to the sewer pipe at the other end of the module, whereby the module itself is held in place so that it can uphold portions of the hose which are disposed between the attachment assemblies at the ends of the module.

A particular objective is to provide right and left hose-engaging portions which are formed respectively by at least two right telescoping members, which latter are telescopically interconnected and by at least two left telescoping members which latter are also telescopically interconnected.

A particular object is to have the transverse connecting means being flexible so that the right and left portions of the module can be brought laterally towards each other for compact storage.

An objective is to facilitate lengthwise telescoping by providing the flexible straps forming the transverse connecting means and which are disposed along an inner one of the lengthwise sections with the characteristic of being slidable along the length of those telescoping members to which they are attached for permitting lengthwise telescopic collapsing of the length of the module.

DESCRIPTION OF THE PREFERRED EMBODIMENT

Figure 1:
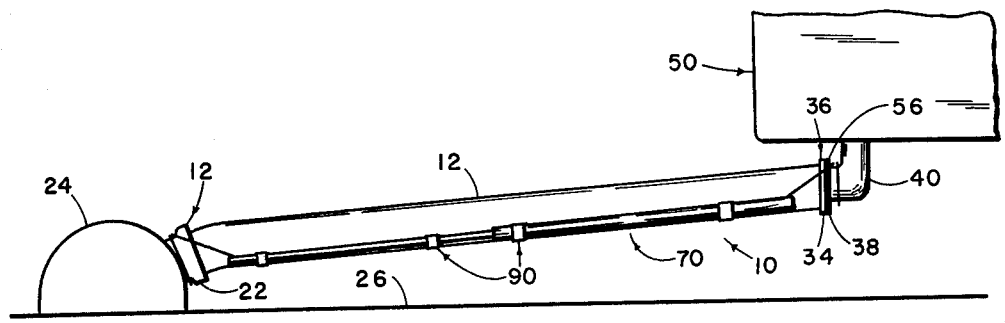
FIG. 1 is a side elevation of a rear portion of a house trailer representing a sample recreational vehicle, and having a sewage outlet to which a hose is coupled leading to a sewer pipe mounted on the ground, and into which the hose is attached, the sewage hose support system of this invention being mounted thereon.

The trailer sewage hose support system of this invention is generally indicated at 10 in FIG. 1 and is adapted to support an elongated flexible hose 12, which latter is of a type not only laterally flexible, but which is adapted to collapse lengthwise to a considerable extent.

Hoses of the type shown at 12 are commonly connected to many types of vehicles in order to connect them to a sewer pipe, such as shown at 20 in FIG. 1, having a flange 22, the pipe being embedded in concrete 24 rested on the surface of the ground 26.

The upper end of the hose 12 has one-half portion 34 of a coupler, generally indicated at 36, attached thereto. The other half portion of the coupler 36 is shown at 38, and is fixed to a downwardly extending pipe 40, which can be called a vehicle sewage outlet pipe 40 extending downwardly from a vehicle, generally indicated at 50, which can be a trailer with wheels for going over the highway, or which can be a boat, which can either be on a trailer or even at a dock in a marina.

The recreational vehicle 50 could be a camper, a common housetrailer or a motor home.

The coupler 36 is not further described since it is not a part of the invention, except to say that the coupler 36 provides a flange 56 useful in connection with this invention as later described.

The recreational vehicle 50 could be of a type supported on wheels, such as in the case of a camper, a house trailer or motor home, or a boat, which latter might its own wheels or a trailer under it. Any of these examples can be recognized to be a dwelling in a sense, if only a temporary dwelling at times. However, the unit 50 could also be a permanent dwelling.

Figure 4:
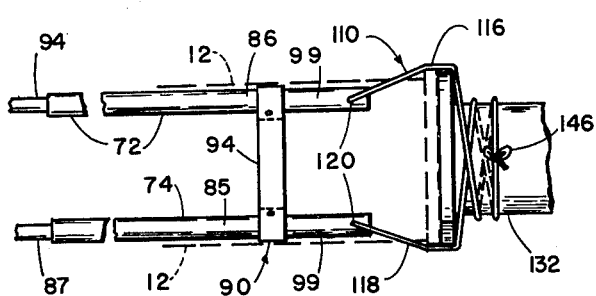
FIG. 4 is a detailed top plan view of the right hand end of the parts shown in FIG. 2, but with the hose and half of a coupler which attaches it to the other half of a coupler being shown in dotted lines.

This invention supports the hose 12 by means of providing an elongated support assembly module, generally at 70, having right and left hose-engaging portions 72 and 74, seen in FIG. 4, each of which have upwardly facing surfaces for engaging the right and left undersides of the hose 12.

The module 70 has two lengthwise sections, generally indicated at 82 and 84, which latter can be considered a first or upper lengthwise section 82 and a lower or second lengthwise section 84.

The upper lengthwise 82 comprises right and left tubes 85 and 86 extending lengthwise of the hose 12. The second or lower lengthwise section 84 comprises right and left straight elongated tubes 87 which are respectively telescopically received in the lower ends of the right and left upper tubes 85 and 86.

Figure 2:
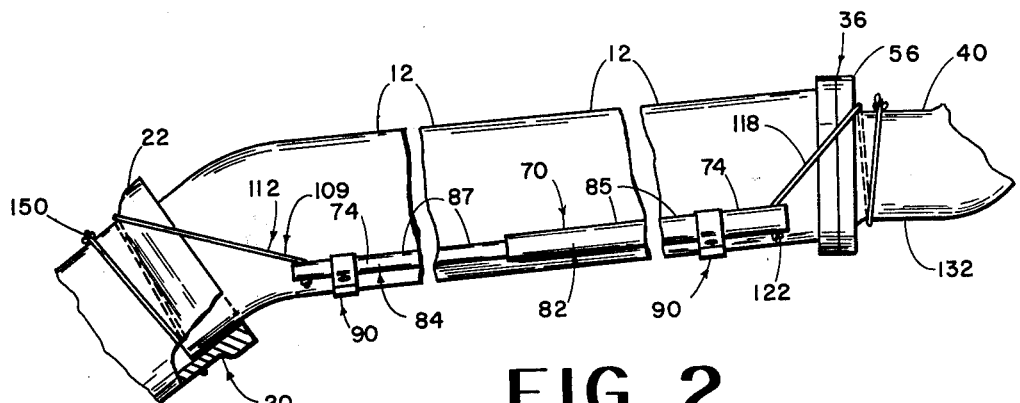
FIG. 2 is a detailed view showing only central portions of the parts shown in FIG. 1, and with certain parts of both the hose and sewage hose support system being broken away and a portion of the ground mounted sewer pipe broken away to show the hose inserted therein.
Figure 3:
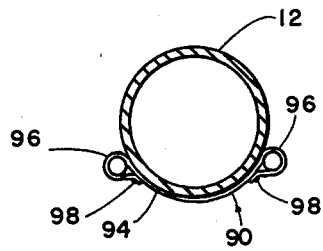
FIG. 3 is a sectional view taken laterally through the hose in a position for showing one of the straps in end view, which latter hold right and left portions of the support system from spreading apart.

A transverse connecting assembly is generally seen at 90 in FIGS. 1 and 2 and preferably is in the form of a plurality of flexible transverse connecting straps 94, best seen in detail in FIGS. 3 and 4. Each strap 94 is connected to a right and a left hose-engaging portion 72 and 74 of the module 70 by means of wrapping of the respective strap 94 over the top of a respective one of the tubes 85, 86 or 87, and around the outer side of the respective tube and in under the underside and being fixed there by a rivet 98 placed in a manner so that the larger head of the rivet is on the bottom side to allow the top side to be as smooth as possible where it faces the pipe 12.

Each strap 94 snugly fits the underside of the pipe 12 so as to give it support but chiefly the purpose of each strap 94 is to prevent the spreading apart of respective ones of the right and left hose-engaging portions 72 and 74, best seen in FIG. 4, so that the latter stay in place to support the pipe 12 on their upwardly facing surfaces 99.

The flexibility of the straps 94 is such as to make it possible for the right and left hose-engaging portions 72 and 74 to be moved toward each other for storage and away from each other for use.

The lower telescoping members 87 are disposed inside of the upper telescoping members 85 and 86, respectively, and the telescoping members are all substantially straight so as to hold the hose 12 straight.

As best seen in FIGS. 2 and 4, the space above the hose-engaging surfaces 99 is substantially empty for economy of construction and so that the support assemblies can be placed against the underside of the hose by a movement of the support assemblies upwardly toward the bottom of the hose. The factor that the space along the module 70 between the upwardly facing hose-engaging surfaces 99 on the right and left is open along most of the length of the module 70 allows sleet, snow and rain to pass therethrough freely, whereby it does not tend to build up into ice which might hold cold temperatures against the underside of the hose 12 in a way that might cause it to freeze the contents.

A module support assembly for supporting the module 70 against the undersides of the hose 12 is generally indicated at 109 in FIG. 2, and comprises upper and lower module support assembly sections, generally indicated at 110 and 112 in FIGS. 2 and 4. The module support assembly section 110 in FIG. 4 is composed of two cords 116 and 118 which extend downwardly through openings 120 in respective ones of the tubes 85 and 86, lower ends of the cords 116 and 118 each being provided with a knot 122, one of which is seen in FIG. 2. The cords 116 and 118 extend upwardly across the upper side of the sewage outlet pipe 40 on that side of the flange 56 which faces away from the hose 12 and then are wrapped around the vehicle sewage outlet pipe 40, and then tied into a knot at 146. A similar module support assembly section 112 is attached to the lower tubes 87, respectively, similar that is to the upper support section 110, and so the section 112 is not as fully described herein, except to say that its preferred way is to utilize the flange 22 extending up from the ground sewage pipe 20 and to wrap around the ground sewage pipe 20 and be tied at 150. The construction of the upper and lower module support sections 110 and 112 is identical in all respects, preferably.

I claim:

1. A sewage hose support system for recreational vehicles comprising an elongated support assembly module having right and left elongated hose-engaging portions having upwardly facing surfaces for engaging the right and left undersides of a sewage hose extending from a sewage outlet fitting on such a vehicle to a sewage disposeal pipe, said module having two lengthwise sections telescopically attached to each other so that said lengthwise sections can be chiefly disposed under different lengthwise sections of said hose, each lengthwise section of said system having portions defining parts of said right and left hose-engaging portions, and means engaging said module for supporting said module whereby said module can support said hose, said right and left hose-engaging portions being respectively formed by at least two right aligned telescoping members which latter are telescopically interconnected and by at least two left aligned telescoping members which latter are also telescopically connected and laterally spaced with respect to the length of said module from said two right telescoping members, and transverse flexible connecting means connecting said left telescoping members with said right telescoping members so as to prevent said right and left hose-engaging portions from spreading apart, said transverse connecting means comprising a plurality of flexible straps interconnecting said right and left hose-engaging portions, the flexibility of said straps making it possible for said right and left hose engaging portions to be moved laterally towards each other for storage and away from each other for use.

2. The sewage hose support system of claim 1 having one of said two right telescoping members being disposed inside the other and one of said two left telescoping members being disposed inside the other, the inner ones of said telescoping members being respectively disposed opposite each other, and said flexible straps being slidable along the length of the said inside ones of said telescoping members for permitting lengthwise telescopic collapsing of the length of said module for storage.

3. The sewage hose support system of claim 1 having the space above said hose-engaging surfaces empty for economy of construction and so that said support assemblies can be placed against the underside of said hose by a movement of said support assemblies upwardly toward the bottom of said hose.

4. The sewage hose support system of claim 3 in which the space along said module between said upwardly facing hose engaging surfaces is open along most of the length of the module to allow sleet and snow and rain to pass therethrough freely.

5. The sewage hose support system of claim 1 having said means engaging said module for supporting said module comprising cord means disposed at least one end of said module to a trailer supported sewage outlet element or to a sewage pipe.

* * * * *